(12) United States Patent
Morley

(10) Patent No.: US 9,934,713 B2
(45) Date of Patent: Apr. 3, 2018

(54) MULTIFUNCTION WRISTBAND

(71) Applicant: QUALCOMM Incorporated, San Diego, CA (US)

(72) Inventor: Stewart Morley, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 13/828,203

(22) Filed: Mar. 14, 2013

(65) Prior Publication Data

US 2013/0262298 A1    Oct. 3, 2013

Related U.S. Application Data

(60) Provisional application No. 61/616,592, filed on Mar. 28, 2012.

(51) Int. Cl.
| | | |
|---|---|---|
| *G09G 3/20* | (2006.01) | |
| *G06Q 20/32* | (2012.01) | |
| *G06F 1/16* | (2006.01) | |
| *H04M 1/725* | (2006.01) | |
| *H04B 1/3827* | (2015.01) | |
| *H04M 1/05* | (2006.01) | |

(Continued)

(52) U.S. Cl.
CPC ............ *G09G 3/20* (2013.01); *G06F 1/163* (2013.01); *G06Q 20/325* (2013.01); *H04B 1/385* (2013.01); *H04M 1/05* (2013.01); *H04M 1/7253* (2013.01); *G06F 2200/1637* (2013.01); *G06K 9/00335* (2013.01); *G06K 9/00355* (2013.01); *H04B 2001/3861* (2013.01); *H04M 1/57* (2013.01); *H04M 2250/12* (2013.01); *H04M 2250/22* (2013.01)

(58) Field of Classification Search
USPC .................................................... 705/1.1, 40
See application file for complete search history.

(56) References Cited

U.S. PATENT DOCUMENTS

| | | | |
|---|---|---|---|
| 7,593,755 | B2 | 9/2009 | Colando et al. |
| 7,920,047 | B2 | 4/2011 | Bates |
| 8,160,959 | B2 | 4/2012 | Rackley, III |

(Continued)

FOREIGN PATENT DOCUMENTS

| | | |
|---|---|---|
| CN | 101640712 A | 2/2010 |
| CN | 104247383 A | 12/2014 |

(Continued)

OTHER PUBLICATIONS

"Perimeter" definition, Wikipedia.org, Feb. 21, 2017.*

(Continued)

*Primary Examiner* — Namrata Boveja
*Assistant Examiner* — Joseph W King
(74) *Attorney, Agent, or Firm* — Kilpatrick Townsend & Stockton, LLP

(57) ABSTRACT

Embodiments of the invention are directed toward a multifunction wristband (or other wearable device) providing a lifestyle display that outwardly displays to other people the interests and social connections of the wearer, which can include data related to music, social media, charities, and more. The multifunction wristband can act either as a stand-alone device or as a companion device to another personal electronic device. Furthermore, it can incorporate a variety of additional useful features.

40 Claims, 9 Drawing Sheets

(51) Int. Cl.
*G06K 9/00* (2006.01)
*H04M 1/57* (2006.01)

(56) References Cited

U.S. PATENT DOCUMENTS

| | | | |
|---|---|---|---|
| 8,279,716 B1* | 10/2012 | Gossweiler, III | H04M 1/72552 368/10 |
| 8,988,349 B2 | 3/2015 | Alberth et al. | |
| 2004/0157648 A1 | 8/2004 | Lightman | |
| 2004/0189476 A1* | 9/2004 | Borovoy et al. | 340/573.1 |
| 2005/0187873 A1* | 8/2005 | Labrou et al. | 705/40 |
| 2005/0276164 A1 | 12/2005 | Amron | |
| 2010/0321275 A1* | 12/2010 | Hinckley | G06F 1/1618 345/1.3 |
| 2011/0059769 A1 | 3/2011 | Brunolli | |
| 2011/0112920 A1* | 5/2011 | Mestre et al. | 705/17 |
| 2011/0193779 A1* | 8/2011 | Williams | 345/163 |
| 2012/0220219 A1* | 8/2012 | Hill et al. | 455/41.1 |
| 2013/0120106 A1* | 5/2013 | Cauwels | G06F 1/163 340/3.1 |
| 2013/0222271 A1* | 8/2013 | Alberth | G06F 1/163 345/173 |

FOREIGN PATENT DOCUMENTS

| | | |
|---|---|---|
| EP | 2150031 A1 * | 2/2010 |
| EP | 2357548 A2 | 8/2011 |
| KR | 20100130478 A | 12/2010 |

OTHER PUBLICATIONS

Definition of "disposed", http://www.dictionary.com/browse/disposed.*
Kanis, et al., "Toward Wearable Social Networking with iBand," CHI '05 Extended Abstracts on Human Factors in Computing Systems, ACM 1-59593-002-7/05/0004, Apr. 2-7, 2005.
Partial International Search Report—PCT/US2013/033749—ISA/EPO—dated Jul. 11, 2013.
International Search Report and Written Opinion—PCT/US2013/033749—ISAEPO—dated Sep. 12, 2013.

* cited by examiner

MULTIFUNCTION WRISTBAND

CROSS-REFERENCE TO RELATED APPLICATION

The present application is a non-provisional of and claims the benefit and priority under 35 U.S.C. 119(e) of U.S. Provisional App. No. 61/616,592, filed Mar. 28, 2012, entitled "MULTIFUNCTION WRISTBAND", the entire contents of which are incorporated herein by reference for all purposes.

BACKGROUND

Mobile phones and other personal electronic devices can provide a user with a vast number of applications for performing countless functions. Accordingly, such personal electronic devices are not only becoming increasingly ubiquitous, but are being used more and more by users, impacting users' lifestyles in various aspects. Most personal electronic devices, however, have little or no way of visually conveying a user's interests and social connections to other people.

SUMMARY

Embodiments of the invention are directed toward a multifunction wristband (or other wearable device) providing a lifestyle display that outwardly displays to other people the interests and social connections of the wearer, which can include data related to music, social media, charitable causes, and more. The multifunction wristband can act either as a stand-alone device or as a companion device to another personal electronic device. Furthermore, it can incorporate a variety of additional useful features.

An example wearable apparatus, according to the disclosure, includes a wireless interface configured to receive data indicative of social information from a device, and a display coupled with the wireless interface and configured to show one or more images indicative of the received social information. The one or more images are configured to be seen by at least one person other than a user wearing the wearable apparatus, to convey the social information, while the wearable apparatus is being worn by the user.

An example wearable apparatus for displaying images, according to the disclosure, includes attaching means for attaching the wearable apparatus to a user, communication means for wirelessly receiving data indicative of social information from a device, and display means for showing one or more images indicative of the received social information. The one or more images are configured to be seen by at least one person other than the user, to convey the social information, while the wearable apparatus is attached to the user via the attaching means.

An example non-transitory computer-readable medium, according to the disclosure, has instructions embedded thereon for displaying images on a wearable apparatus. The instructions include computer-executable code for receiving, with a wireless interface of the wearable apparatus, data indicative of social information from a device, and causing a display of the wearable apparatus to show one or more images indicative of the received social information. The one or more images are configured to be seen by at least one person other than a user of the wearable apparatus, to convey the social information, while the wearable apparatus is being worn by the user.

An example method of displaying images on a wearable apparatus, according to the description, includes receiving, with a wireless interface of the wearable apparatus, data indicative of social information from a device, and causing a display of the wearable apparatus to show one or more images indicative of the received social information. The one or more images are configured to be seen by at least one person other than a user of the wearable apparatus, to convey the social information, while the wearable apparatus is being worn by the user.

An example method, according to the disclosure, includes receiving data indicative of social information, configuring one or more images indicative of the received social information for display by a wearable device to a person other than a user wearing the wearable device, and wirelessly transmitting the one or more images to the wearable device.

The method can include one or more of the following features. The method can include receiving information indicative of an orientation or motion of the wearable device, and configuring the one or more images can be based on the information indicative of the orientation or motion. Configuring the one or more images can include determining a location on the wearable device at which to display the one or more images, adjusting a size or orientation of the one or more images, and/or adjusting textual elements within the one or more images. The one or more images can be indicative of a charity supported by the user. Moreover, the one or more images can indicate a progress toward a donation goal for the charity. The method can also include transmitting information to the wearable device to cause the one or more images to appear to fade based on a time since a donation for the charity was received.

Additionally or alternatively, the method can include one or more of the following features. The method can include transmitting an SMS to a server to donate to the charity. Configuring the one or more images can include configuring the one or more images to indicate a frequency at which the social information is received. The method can include receiving information from the wearable device indicative of an interaction with a second device, and transmitting information to a server based on the information indicative of the interaction. The transmitted information can include payment information and/or a request for media that a user of the second device is consuming. The second device can include a wearable device and/or a payment terminal. The method may also include receiving sensor data from the wearable device and authorizing an action or authenticating the user based on the received sensor data.

Items and/or techniques described herein may provide one or more of the following capabilities, as well as other capabilities not mentioned. Techniques can provide for displaying social information from email, music, social media, charities, and/or other information sources, with a wearable apparatus, in a manner viewable by people other than the user while the wearable apparatus is being worn by the user. Embodiments provided herein further provide an array of additional functions, allowing users to share information about charitable causes, access messages and media, make payments and/or donations, and/or extend the functionality of a mobile phone or other personal electronic device. These and other embodiments, along with many of its advantages and features, are described in more detail in conjunction with the text below and the attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
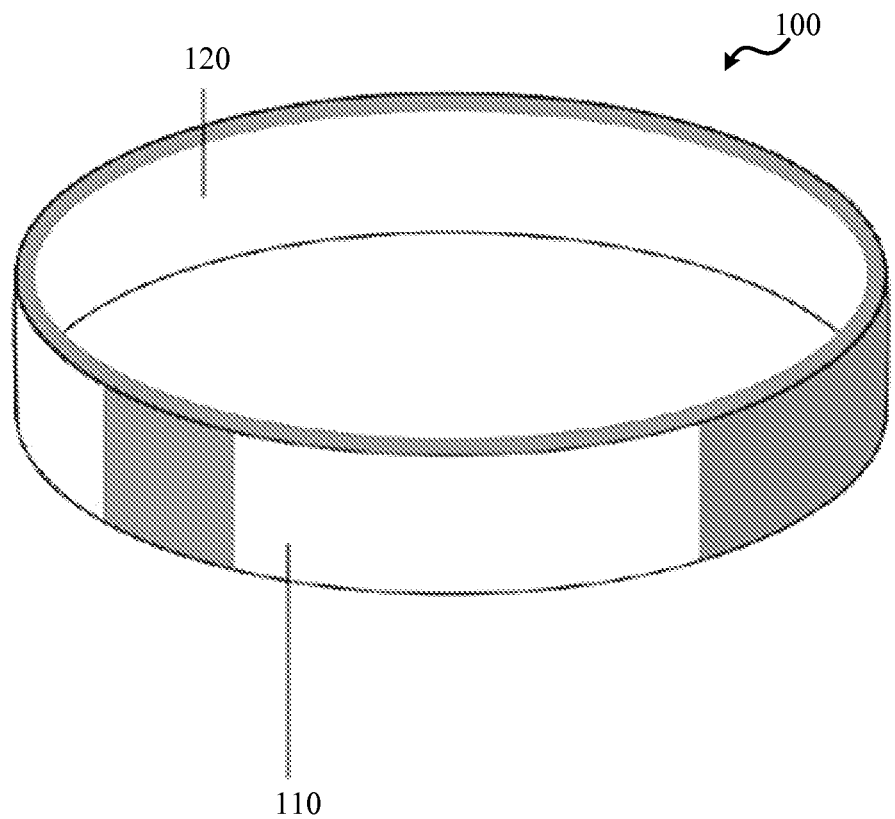
FIG. 1 is a simplified drawing of a multifunction wristband according to one embodiment.

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

Modern personal electronic devices, such as cell phones, tablets, personal media players, and the like provide vast functionality through innumerable applications, and allow users to surf the web and communicate with others in a variety of electronic ways. Embodiments of the invention utilize a wristband or other wearable device, with a display, that can be used as a stand-alone device and/or a slave device to bring at least some of the functionality of modern personal electronic devices in a more easily-accessible and fashionable form factor. Furthermore, embodiments can include a lifestyle display that can be configured to display items for viewing by people other than the user.

FIG. 1 is a simplified drawing of a multifunction wristband 100 according to one embodiment. In this embodiment, the multifunction wristband 100 includes an inner surface 120 (located proximate to a user's wrist when the multifunction wristband 100 is worn) and an outer surface 110, in which a display is embedded or otherwise located such that the display is visible to the user when the multifunction wristband 100 is worn. In some embodiments, for example, the display can be a flexible display that extends partially or completely around the outer surface 110. The multifunction wristband 100 can be utilized, in some embodiments, to extend the functionality of a personal electronic device. For example, the multifunction wristband 100 may wirelessly communicate with a mobile phone or other electronic device using Bluetooth®, Near Field Communication (NFC), Peanut®, or Zigbee® connection or other means of wireless communication. In other embodiments, the multifunction wristband 100 may be a stand-alone device that provides some or all of the functionality described herein, independent of whether the multifunction wristband 100 is actively communicating with a personal electronic device.

As indicated herein below, in addition to providing functionality to a user (e.g., wearer of the multifunction wristband 100), the multifunction wristband 100 can display images intended to be seen by people other than the user while the multifunction wristband 100 is being worn by the user. Accordingly, the multifunction wristband 100 can display items differently depending on whether the multifunction wristband 100 is in a "public" mode (i.e., intended to be seen by people other than the user) or a "personal" mode (i.e., intended to be seen by the user). When in the public mode, the multifunction wristband 100 may display images such as pictures, text, video, and the like, in a manner that is viewable by people other than the user. This can include, for example, displaying images on portions of the display that are not easily viewable by the user (e.g., located on a field of view directed away from the user), showing relatively large text (that can be read by people other than the user), displaying images such that they are oriented away from the user (e.g., they may appear upside-down to the user), adjusting a color scheme or contrast or brightness of text and/or images (e.g., such that they may be perceived easier by someone at a distance), changing an aspect ratio of displayed images, and the like. In contrast, when in the personal mode, the multifunction wristband 100 may display images in a manner that is more easily viewed by the user. This can include, for example, displaying images on portions of the display that are easily viewable by the user (e.g., located on a field of view directed toward the user), showing relatively small text, displaying images such that they are oriented toward the user (e.g., they may appear upside-down to people other than the user), and the like. Depending on the application, the images shown in a public mode may be different than those shown in a personal mode and/or redacted with respect to the personal mode. Moreover, whether the multifunction wristband 100 includes public and/or personal modes may be application dependent.

Figure 2A:
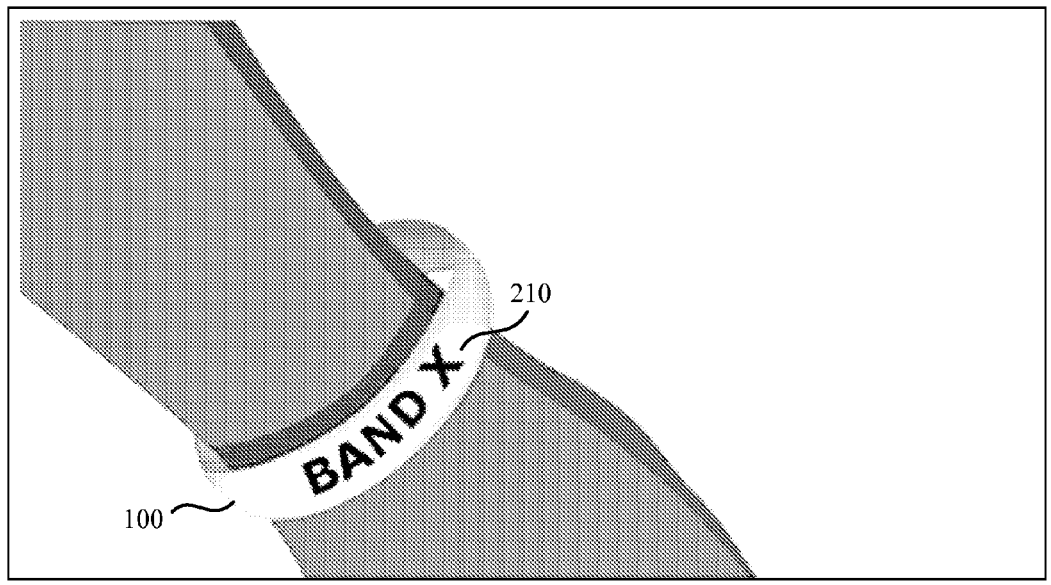
FIGS. 2A and 2B are illustrations of a wristband showing public and private modes of a music player application, according to one embodiment.
Figure 2B:
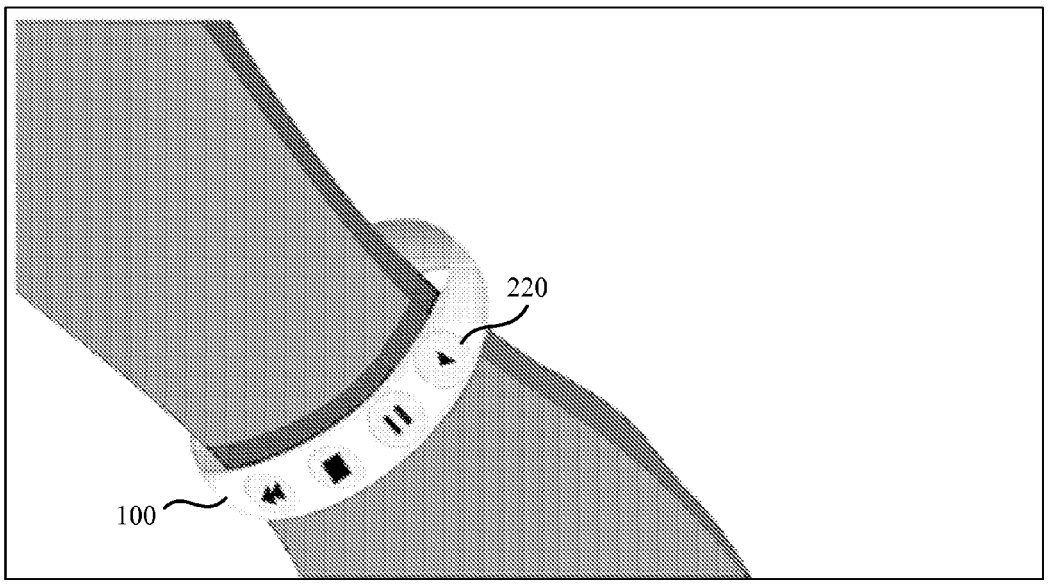

FIGS. 2A and 2B are illustrations of how a multifunction wristband 100 can display public and private modes of a music player application, according to one embodiment. (In both FIGS. 2A and 2B, the arm is extended downward with the wrist at the bottom of each figure.) In FIG. 2A, the multifunction wristband 100 displays a public mode of the music player application in which the displayed images 210 comprise text of an artist name ("BAND X"), which may correspond to a song currently being played back by the music player application. The text is in a large font and oriented away from the user (e.g., upside-down from the user's perspective) so as to be viewable by people other than the user. In FIG. 2B, the multifunction wristband 100 displays a personal mode of the music player application in which the displayed images 220 include controls oriented toward the user (e.g., rightside-up from the user's perspective), enabling the user to control playback of the music.

The multifunction wristband 100, can toggle between public and personal modes in any of a variety of ways, depending on desired functionality. For example, the user may press a button, touch a surface of the display, and/or interact with the multifunction wristband 100 in a similar manner to cause the multifunction wristband 100 to enter into a public or personal mode. Additionally or alternatively, certain motions and/or orientations may cause the multifunction wristband 100 to enter into a public or personal mode. For example, movements and/or orientation indicating that the multifunction wristband 100 is at the user's side may cause the multifunction wristband 100 to enter a public mode. Conversely, movements and/or orientation indicating a user has lifted his or her wrist and/or may be looking at the multifunction wristband 100 may cause the multifunction wristband 100 to enter a personal mode. In some embodiments, the multifunction wristband 100 can utilize gaze-detection technologies to determine if a user is looking at the multifunction wristband 100. If so, it can enter a personal mode. Additionally or alternatively, embodiments may incorporate and/or be communicatively coupled with cameras and/or other sensors to implement gaze and/or face detection to determine if the multifunction wristband 100 is being viewed by a user and/or other person. The multifunction wristband 100 can then configure content in a manner viewable to anyone who is looking at the wristband. This can be utilized in conjunction with other input (e.g., motion and/or orientation data). For example, when the arm is raised and user is looking at the multifunction wristband 100, the multifunction wristband 100 can determine the user is looking at it and configure content accordingly (e.g., enter a personal mode). On the other hand, when the multifunction wristband 100 is at the user's side or when the user is resting his or her arm on a table, the multifunction wristband 100 may configure content to be viewable by whomever is determined to be currently looking at the multifunction wristband 100. Depending on desired functionality, if a person other than the user is looking at the multifunction wristband 100, content may be displayed in a generic public mode or configured (e.g., oriented) specifically to be viewed by the person looking at the multifunction wristband 100.

In addition to the basic functionality described above, the multifunction wristband 100 can include features to provide some or all of the functions described below.

Music and Lifestyle Display, and Social Sharing and Interaction

According to some embodiments, the multifunction wristband can be utilized to display a user's allegiance to or temporary interest in a particular culture. Many people, fans of a particular music band, for example, desire to share tastes in music, websites, and other interests they participate in. When listening to music on a personal media player, however, information regarding the music a user is listening to cannot be seen. Furthermore, if the user is wearing headphones, the music cannot be heard either.

As a music and lifestyle display, the multifunction wristband 100 can provide a user an outlet to publicly display the user's choice in music or culture. In one embodiment, the multifunction wristband 100 can be wirelessly connected, as described above, with a personal media player (mobile phone, tablet, etc.) to display information regarding a song the user is currently listening to. The display could can various forms of information such as text (scrolling or static) of the name of the band and song, static image of album art, or even a music video.

The multifunction wristband 100 and/or personal media player may be connected to the Internet—for example using a wireless local area network (WLAN) connection such as a WiFi connection, a wireless wide area network (WWAN) connection such as a cellular connection, or by connecting to the Internet through a personal media player or using other means. Moreover, the multifunction wristband 100 can utilize this connection to relay what the personal media player is playing. The entity receiving this information (e.g., the band) can therefore know what a user is listening to and can communicate information that is shown on the wristband, such as gig tickets, latest news on a new song/album, a live version of the song, and the like. Additionally or alternatively, other cultural information could be displayed, relating to snowboarding, skateboarding, biking, videos, photographs, etc. In some embodiments, when the multifunction wristband 100 and/or personal media player detects a WiFi or other wireless signal (e.g., an open wireless access point), the multifunction wristband 100 can display an alert viewable to the user and/or others in the user's vicinity.

The user may designate which information is shown at a given time by using, for example, touch inputs on the multifunction wristband 100 or using an electronic device (e.g., personal media player) communicatively coupled to the multifunction wristband 100. Additionally or alternatively, the multifunction wristband 100 or communicatively coupled device may be configured to autonomously determine information to display. For example the information displayed may be based on a schedule, an inference of an activity of the user, and the like. As discussed above, the multifunction wristband 100 may be set to passively accept display suggestions, for example from a band that the user is listening to or by coming into contact with other wristband devices. In one embodiment, the multifunction wristband 100 temporarily displays information from one or more other wristband devices that pass within close proximity. In some embodiments, bumping the multifunction wristband 100 against another wristband or wearable device may cause information to be exchanged between the multifunction wristband 100 and the other device, for example over NFC and/or WiFi direct. In some embodiments, media may being presented by one of the wristband devices may be received or transmitted between the wristband devices in this scenario, or information allowing one of the wristbands to request the media, such as a song, from a server or content source may be exchanged.

The multifunction wristband 100 can be configured to accept user input via a touchscreen, accelerometer(s), and/or other sensors. Such input can be conveyed to a personal electronic device to which the multifunction wristband 100 is wirelessly connected, allowing a user to control music and/or other media playing on the personal electronic device with the multifunction wristband 100. If the personal electronic device is playing music, for example, user input could enable changing the selection of songs or playlists to play, and/or enabling playback functions such as pause, rewind, fast-forward, and the like. Such input may also enable a user to download items from the Internet such as new music, logos, applications, and so forth. The connection to the Internet may be provided through a wireless interface of the multifunction wristband 100 directly to the Internet (e.g., using a WiFi and/or cellular connection) or indirectly through the personal electronic device. In some embodiments, the multifunction wristband 100 is configured to communicate music that the user is listening to, for example, to other nearby wristbands. Similarly, the multifunction wristband 100 could transmit album art of photos to other nearby devices. Thus, the multifunction wristband 100 may not only be used to display information regarding a user's personal or social interactions, but the multifunction wristband 100 may be configured to transmit or cause another device to transmit or otherwise interact with neighboring devices. Such transmission or interaction may be controlled by the user of the multifunction wristband 100, may be autonomously performed by the multifunction wristband 100, and/or may be initiated by another user, for example a user of a nearby wristband that views album art on the multifunction wristband 100 and requests to listen to a song from the album.

Figure 3A:
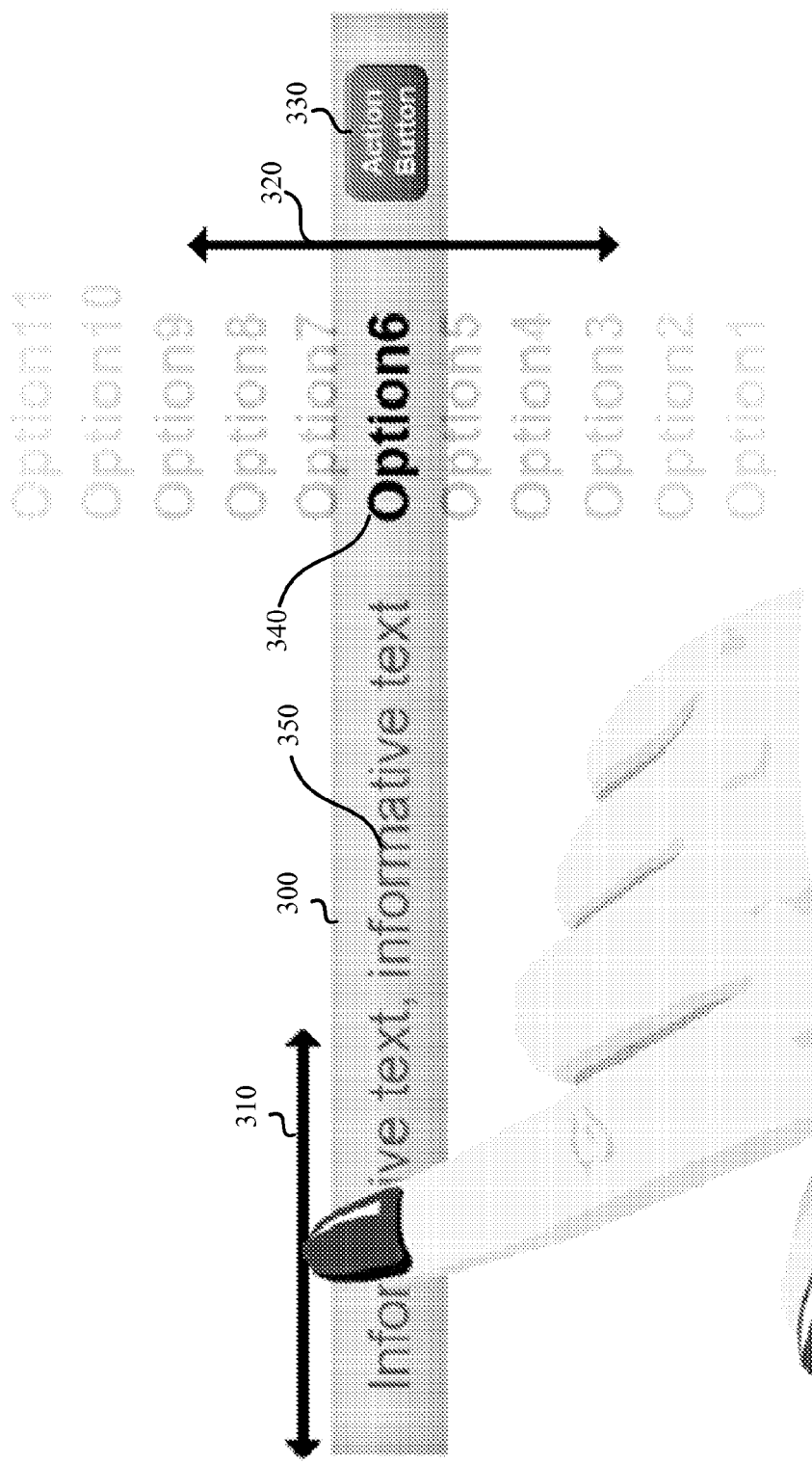
FIG. 3A is an illustration showing functionality of a user interface (e.g., a graphical user interface (GUI)) of the multifunction wristband, according to one embodiment.

FIG. 3A is an illustration showing example functionality of a user interface 300 (e.g., a graphical user interface (GUI)) of the multifunction wristband 100. In this embodiment, the user interface 300, displayed on the display of the multifunction wristband 100, can show informative text 350, a selected option 340, and an action button 330. Where the multifunction wristband 100 enables control of music playback, for example, the option 340 can include a song title, and the informative text can include information such as the name of the band, album, etc.

In some embodiments, the multifunction wristband 100 includes a touchscreen display, enabling the user to drag a finger across the display in a lateral direction 310 to scroll through the informative text. In some embodiments, a length of the finger drag may be used as input, for example to determine how much information to scroll though. In one embodiment, a short finger drag causes the multifunction wristband 100 to advance to the next song, while a long finger drag causes the multifunction wristband 100 to advance several songs or to the next album. Similarly, a velocity of the finger drag may also be used as input, independent or in combination with the length and/or direction of finger drag. Dragging a finger across the display in a vertical direction 320 can enable the user to select between options 340. An action button 330 can allow a user to select (e.g., play) the option 340 shown on the user interface 300. Additionally or alternatively, other input devices can be used to provide similar functionality. Moreover, as discussed below, similar touchscreen capabilities can be utilized in other functions of the multifunction wristband 100 provided herein.

Figure 3B:
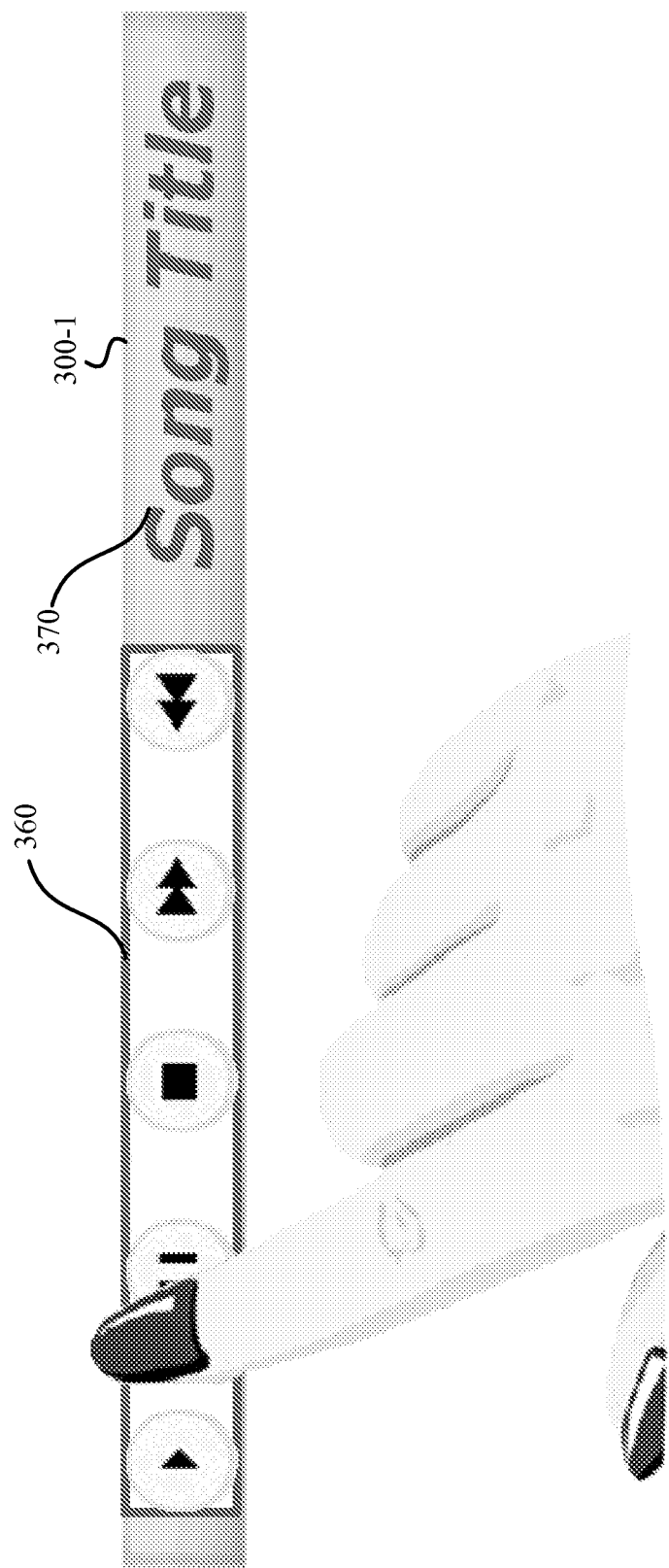
FIG. 3B is an illustration showing an example user interface of a multifunction wristband with an interactive control panel for controlling music playback.

FIG. 3B is an illustration showing example user interface 300-1 of the multifunction wristband 100 with an interactive control panel 360 for controlling music or other media playback. In this embodiment, the user interface 300-1, provides touchscreen buttons in the interactive control panel 360 enabling a user to control the playback of music. A song title 370 of the currently-playing song is also provided, although any of a variety of other related text or images could be provided additionally or alternatively. For example, a band logo or album artwork may be shown. Moreover, as indicated above, a user may be able to select a different song and/or playlist by swiping the song title 370 in vertical and/or horizontal directions. A person of skill in the art will recognize many alterations, substitutions, and variations.

Social Media Indicator

Some embodiments of the multifunction wristband 100 can be utilized as a social media indicator. A large part of the dynamics of interaction on social media is driven by response, and the anticipation of those responses from other people. Current participation within social media activities and online communities involves the use of a mobile phone or personal computer, limiting the opportunities to scan/view status, popularity, and/or influence on any online community, as well as responses from your fans/followers and peers. Additionally, certain metrics of a user's level of activity within an online community are closely tied in to ego and the perception of personal status, but there is no overt way of exteriorizing said status on a personal level, i.e. displaying it as a 'badge of honor' in the real world. The addictive nature of social media means users have a need for more immediate awareness of the responses to their online activities, as a measure of their status and/or popularity. However, polling all social networking services for activity can be a time consuming process, especially when a user is not in front of a computer or if the user's mobile phone is in a bag or pocket.

The multifunction wristband 100 can notify a user of activity on their chosen online services (e.g. Twitter®, Facebook® (or other social network), email, RSS feed, instant message, website, etc.). (As used herein, "RSS" can refer to Really Simple Syndication, RDF Site Summary, and/or Rich Site Summary. Techniques described herein may apply to other information feeds as well.) This gives the user an at-a-glance indication of the latest activity on these services, without the need to explicitly check larger devices, which may be inaccessible or inappropriate. The multifunction wristband 100 can act as a slave device, with a wireless interface to send and receive data to and from a local master device (e.g. a mobile phone or personal computer). Additionally or alternatively, the multifunction wristband 100 can communicate with a cloud-based service to receive notifications and configuration settings.

The multifunction wristband 100 may also come equipped with a vibration device and/or speaker. This can enable the multifunction wristband 100 to provide tactile (vibrational), audio, and/or visual feedback alerts, prompting a user to look at the band that shows a notification or trend related to a social network, RSS feed, etc. Depending on the technology utilized, the multifunction wristband 100 may additionally or alternatively generate or simulate other types of haptics (e.g., texture, stickiness, etc.) to provide feedback in other ways.

In some embodiments, the multifunction wristband 100 can be configured either though software running on the master device or through a web service. This can enable the user to choose which online services the multifunction wristband 100 will be associated with and display activity for. Once these settings have been made, the multifunction wristband 100 can be updated wirelessly.

Figure 4:
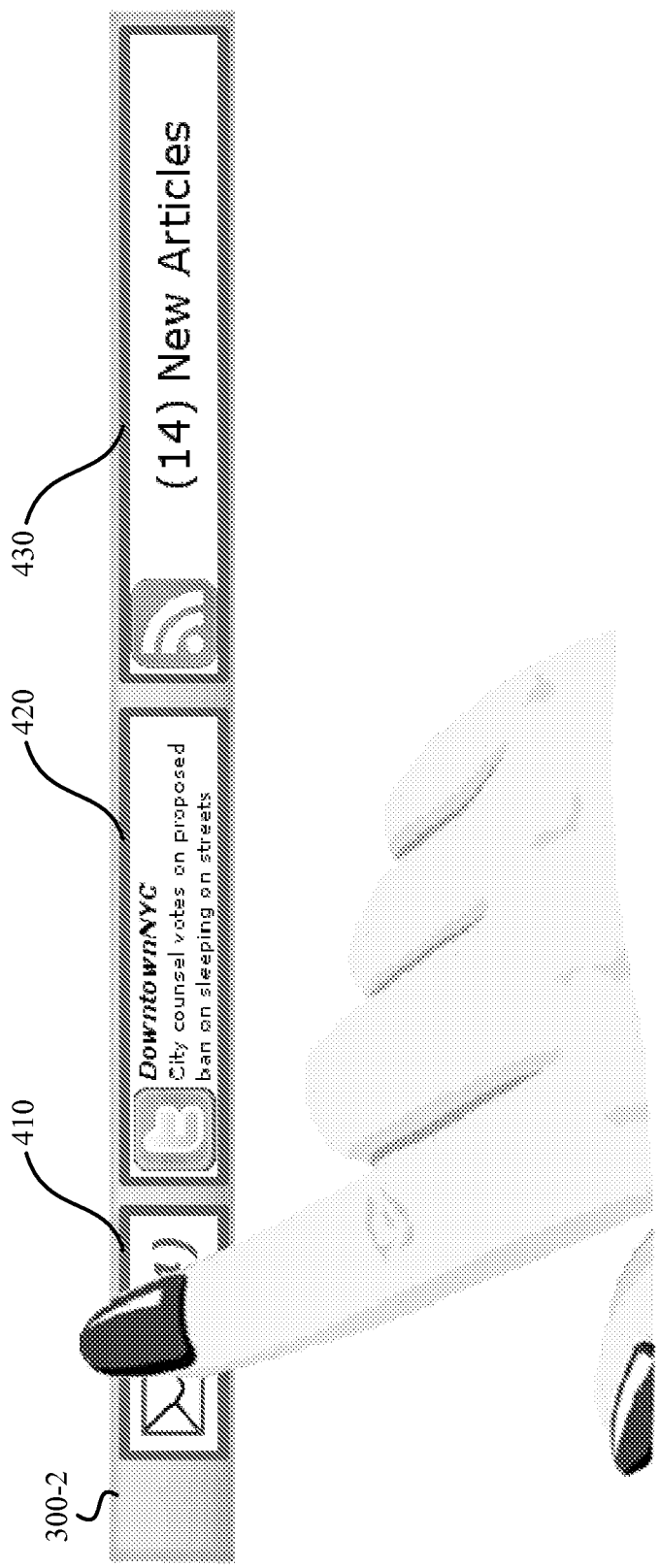
FIG. 4 is an illustration of a user interface of a multifunction wristband configured to display social media, according to one embodiment.

FIG. 4 is an illustration of a user interface 300-2 of a multifunction wristband 100 configured to display social media, according to one embodiment. In this embodiment, the user interface 300-2 includes an email indicator 410, a social network indicator 420, and an RSS feed indicator 430. Each of these indicators may include images with icons and/or text to provide a wearer with the status of respective media sources. For example, the email indicator 410 and RSS feed indicator 430 provide indications of how many respective emails and articles are unread. The social network indicator 420 provides the latest updates of a social network feed.

The functionality of the user interface 300-2 of FIG. 4 can vary. In some embodiments, the indicators 410, 420, 430 can include buttons and/or may be swiped to provide more information and/or show separate feeds. New and/or alternative indicators 410, 420, 430 may appear on the user interface 200-2, depending on user preferences and/or the status of feeds of the indicators 410, 420, 430. Text can be shown to allow a wearer to read emails, articles, and the like. Multiple indicators 410, 420, 430 of a single type (e.g., multiple social network indicators 420) may be displayed.

Indicators 410, 420, 430 may appear and/or disappear depending on the status, priority, user preferences, and/or the like.

Embodiments may include a user interface providing an indication of social media and other events, without providing items for consumption. For example, rather than providing a social media indicator 420 with text (as shown in FIG. 4), the multifunction wristband 100 can indicate media events using pictures, colors, and/or other non-text indicators. In one example, media types (e.g., social media, RSS feeds, email, and the like) are assigned different colors. When an event occurs for a particular media type (e.g., the user receives an email, a social network message, a new RSS post, etc.), the corresponding color will appear on the wristband, indicating that media for that particular media type is available. Furthermore, as additional events occur for a particular media type, the corresponding colored indicator can grow larger, occupying a larger portion of the user interface. In some embodiments, a color may change to indicate frequency of receiving information (e.g., social media updates and/or messages, new RSS articles, etc.) or messages waiting for review. Ultimately, the user interface can include various color indicators of different media types, each occupying a portion of the user interface relative to the amount of events for that type of media. In some embodiments, the user may touch a color and/or provide other input to evoke a user interface by which the media can be consumed. A person of ordinary skill in the art will recognize various additions, modifications, and substitutions.

Interactive Charity Band

The dynamic qualities of the multifunction wristband 100 can be used as a means of displaying charitable donations/sponsorship activities. It has been a common occurrence for people's small charitable donations to be rewarded with a small token that can be worn or displayed. Examples are lapel badges and, more recently, color-coded rubber wristbands serving as a brand identity for the charity in question. Stickers and badges are short-lived however, limiting the effectiveness of their ability to promote their cause. Furthermore, making payments to a cause that has been identified can be difficult and cumbersome. With this in mind, the functionality of the multifunction wristband 100 can be extended to not only display and promote a cause, but also enable other wristband wearers to instantly discover more about the cause and make donations or take action themselves.

In some embodiments, the multifunction wristband 100 can be configured to, once a user has made a donation to a charity, display a charity's branding on the display of the multifunction wristband 100. Donations can be made through existing channels (websites, phone, etc.) and associated with a particular person and/or personal electronic device (e.g., multifunction wristband 100, mobile phone, and the like). Once the charity (or other entity) verifies payment of the donation, a message (which can include information to display a charity's logo) can be propagated to that person's multifunction wristband 100 via the personal electronic device to which the multifunction wristband 100 is wirelessly connected. The charity's branding can then be displayed by the multifunction wristband 100. (In other embodiments, the branding may be shown before payment is verified.)

Figure 5:
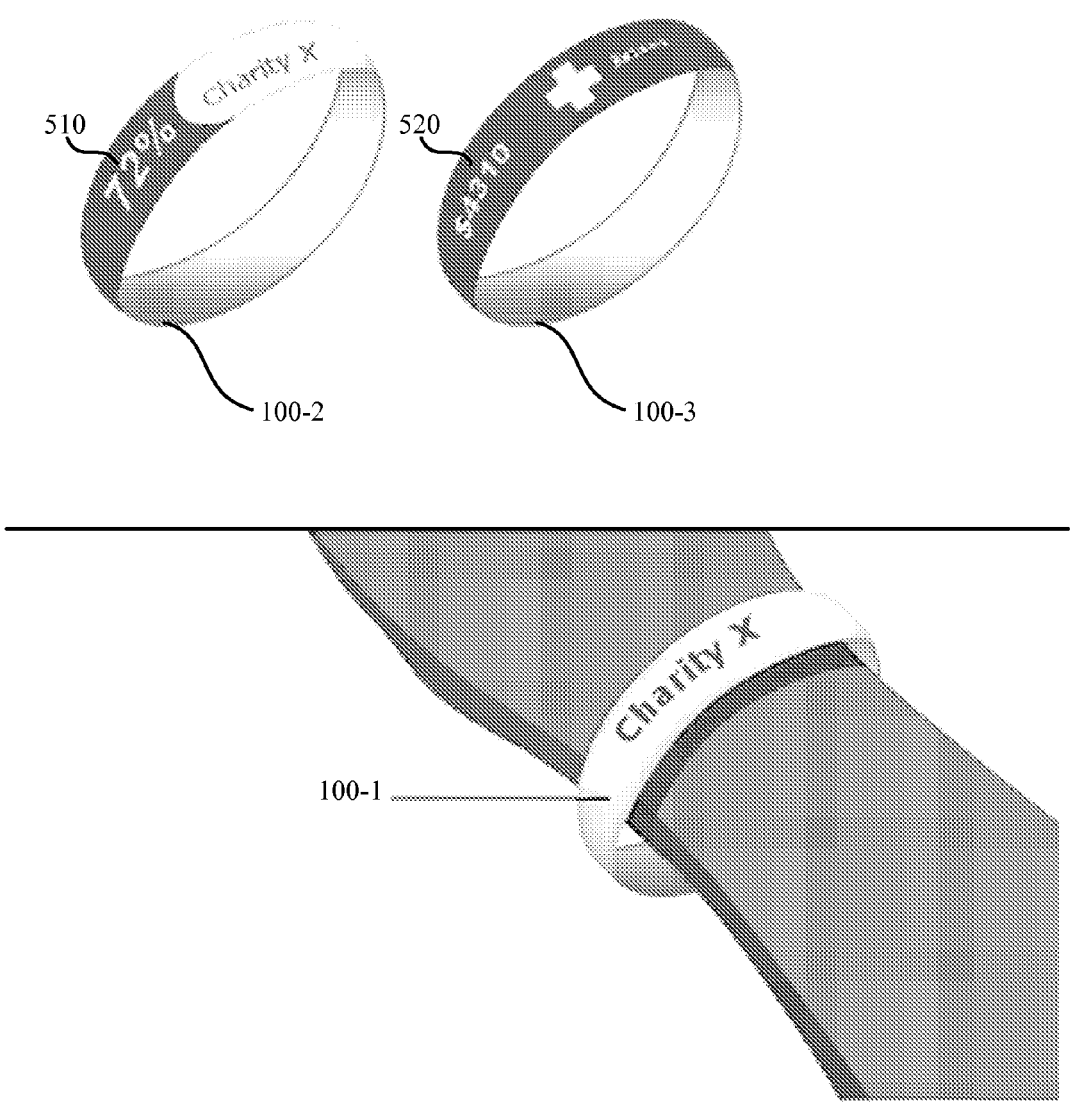
FIG. 5 is an illustration of multifunction wristbands configured to display a charity's branding, according to one embodiment.

FIG. 5 is an illustration of multifunction wristbands 100 configured to display a charity's branding, according to one embodiment. In FIG. 5, a first multifunction wristband 100-1 illustrates how a charity's branding could be displayed by the multifunction wristband 100-1 in relation to a wearer's wrist. A second multifunction wristband 100-2 and a third multifunction wristband 100-3 show alternative displays, indicating a percentage toward a goal 510 and a donation total 520, respectively. The percentage toward a goal 510 and/or a donation total 520 may be provided in various circumstances, such as when an individual (such as the wearer) is collecting donations for a charity or event. In some embodiments, a "thermometer" of received donations or other indicator showing progress toward a goal may be displayed. Other embodiments may display additional or alternative information relevant to a particular charity displayed on the multifunction wristband 100. In some embodiments, a logo, branding, or insignia may only be displayed for a limited time, as described in additional detail below. In order to display the logo again, another donation may be required. In some embodiments, the length of time that such information is displayed may be proportional to the amount or frequency of donation. In some embodiments, the multifunction wristband 100 is configured to display information such that the information appears to slowly fade over time. Thus, the user may be alerted that it is time to make another donation when the display fades. Such embodiments are not limited to monetary donations, but may also be indicative of time or work donated to a charity, donations of blood to a blood bank, etc.

Communication to and/or from the charity could vary, depending on desired functionality. For example, a user may be able to use a mobile phone to send an SMS message to a shortcode number configured to accept donations from corresponding wireless accounts and identify users using the mobile number of the mobile phone from which the SMS message was made. In alternative embodiments, the user may be able to use the multifunction wristband 100 to make the payment, as provided in more detail below. This can apply to personal or gifted donations.

After a donation has been received, the band can be notified of this action via, for example, a dedicated wristband server maintained by the receiving entity or a third party. Depending on the functionality of the multifunction wristband 100, the server can notify the user's wristband either directly or via a master device (e.g., mobile phone). The master device may execute a wristband management application in order to communicate with and manage the multifunction wristband 100. The multifunction wristband 100 then can download the branding information of the charity and display it on the band, without any further action required by the wearer.

According to some embodiments, the display of charity logos may be time sensitive. For example, donations can be set to cause the display of the logos to last for a predetermined amount of time, such as 1 day, 1 week, etc. The predetermined amount of time may be related to the amount of a donation (e.g., a $10 donation causes the display to show a charity logo for 1 week, $20 lasts for 2 weeks, etc.). After this time the branding can expire and can be removed or fade away, mimicking the decay of a real-life artifact. The display or concealment of the logo in relation to other information that the multifunction wristband 100 can display can remain under the full control of the wearer. The multifunction wristband 100 can be configured to display multiple logos corresponding to donations to multiple entities.

As discussed previously, the multifunction wristband 100 also can be configured to may a payment to a charity. For example, multifunction wristband 100 can detect and communicate with a second multifunction wristband 100 in close proximity, using a wireless interface (e.g., Bluetooth®, Near Field Communication (NFC), Peanut®, Zigbee®, etc.). Thus, one multifunction wristband 100 can discover, request and receive information from another. In this manner, details of a charity displayed by the wearer of the first multifunction wristband 100 can be transferred to a second multifunction wristband 100. This allows direct and simple propagation of the cause to be passed between wearers. The shared information would contain details of the charity so that the user could find out more, and provide access to the means by which to make a donation of their own. In some embodiments, information is shared in response to detecting that the wristbands or other wearable devices have "bumped" together or that a substantially simultaneous action has been performed by both, such as handshake motion performed by both.

The information shared could allow a wearer to make a payment to the charity by phone, Internet, or by using SMS functionality of a mobile phone, as stated above. Additionally or alternatively, a wearer may be able to donate to the charity using the multifunction wristband 100. For example, the wearer may be able to provide input (e.g., a movement, touchscreen input, etc.) to the multifunction wristband 100 authorizing payment to the charity. The input may also include a payment amount, information regarding a financial account to fund the payment, and the like. This information can be transferred to a mobile phone, which can be configured to make the payment using, for example, an Internet or other wide area network (WAN) connection. In alternative embodiments, the multifunction wristband 100 may be configured to make the payment directly using a wireless interface (e.g., WiFi, cellular, etc.). Although examples provided herein discuss payment to a charity, embodiments can provide for payments to any of a variety of different types of entities.

Payment Authentication/ID Verification

Some embodiments of the multifunction wristband 100 can also provide for wireless transactions, such as payment authentication and identification (ID) verification. Such wireless transaction technologies (e.g., active/passive Radio Frequency Identification (RFID), NFC, etc.) are used in certain payment cards (e.g., credit cards, debit cards, etc.) and are being contemplated with regard to mobile phones. Problematically, however, mobile phones or the payment card frequently have to be physically held to utilize these technologies in payment transactions. The mobile phones or payment card may not be immediately accessible, being in a pocket, briefcase, or bag. It can be similarly inconvenient for a user to locate a fob or ID card when trying to gain access to a secured area, such as a building. The multifunction wristband 100, on the other hand, can be worn on a wrist and can be configured to conduct these payment and identification transactions.

According to some embodiments, wireless micro payment technology of a mobile phone can be shared with multifunction wristband 100. This can enable a user to "swipe" the payment zone on a shop counter with their wrist, instead of hunting into their pockets or bag to find their mobile phone. In an example scenario, a user may be buying an early morning coffee on the way to work. With hands holding coffee and a briefcase, the user can simply waive the multifunction wristband 100 in front of a payment reader at the checkout area to make the payment.

Although some embodiments of the multifunction wristband 100 may be configured to relay transaction information from a mobile phone or other electronic device, embodiments may additionally or alternatively provide for the multifunction wristband 100 to provide the transaction information itself. For example, the multifunction wristband 100 may include a wireless transaction unit with hardware (e.g., RFID tags) and/or software configured to provide identification information and/or financial information wirelessly. Such information can be encrypted, depending on the application, and such functionality can be used in a variety of applications such as credit card and/or debit card payments, identification to enter a secured or restricted area (e.g., office, school, ski lift, gym, etc.), access to transportation and/or transit systems (e.g., subway, bus, etc.), communication of important information (e.g., medical alert information), and the like. Moreover, the respective employer, transit service, etc. could keep track of the users by determining when and where the information was received from the multifunction wristband 100, or through continuous or intermittent contact with the multifunction wristband 100 via a wireless connection (e.g., Bluetooth, WiFi, etc.). Such information could provide useful life-saving data when there is a fire drill, emergency, or disaster situation.

In some embodiments, the user may need to further authorize use of the information transmitted by the multifunction wristband 100, for example by entering a pin on a keypad on the multifunction wristband 100 or on a keypad associated with the destination of the information, for example when paying for an item. In some embodiments, the user may authorize a transaction or confirm their identity or the authenticity of transmitted information by performing a specific action with the multifunction wristband 100. For example, the multifunction wristband 100 may detect a gesture or other movement of the user's wrist using one or more inertial sensors and/or cameras, and may determine whether the transaction is legitimate based on the detected gesture or movement. Depending on desired functionality, biometric data can additionally or alternatively be used to verify the identity of a user. For example, various sensors can be incorporated into and/or communicatively coupled with the multifunction wristband 100 to determine biometric data. Such sensors may be configured to collect visual information for recognition of the user's face, fingerprint, and/or other physical features. A microphone could be used for voice recognition. Pressure and/or other sensors may be integrated into the multifunction wristband 100 so as to contact the user's skin substantially continuously, for example for recognition of the skin's topography, an electromyographic signature, heart rhythms, and/or other identifying features.

Extended Mobile Phone Functionality

As discussed previously, the multifunction wristband 100 can be a stand-alone device and/or be associated with a mobile phone via a wireless link. In embodiments where the multifunction wristband 100 is associated with a mobile phone via a wireless link, the multifunction wristband 100 may be used to extend the functionality of the mobile phone. Many day-to-day interactions that people have with their mobile phones require a minimal amount of interaction with the device, such as deciding whether to answer an incoming call, checking the number of unread emails, or giving a quick response to a received SMS. Additionally, the user may be in a situation where it is not convenient or acceptable to bring out and use their mobile phone, either because they are in a meeting, have their hands full, or don't feel secure in displaying their expensive device in their current surroundings. Additionally, it can't always be possible to determine the importance of an incoming message when the device is in a bag or pocket. As such the multifunction wristband 100 can be used to control the mobile phone and/or convey information to/from the mobile phone without the need for the user to access the mobile phone directly.

According to certain embodiments, the wrist-worn multifunction wristband 100 can act as a means of both user notification and input. Because the multifunction wristband 100 is within sight and readily accessible by the user means that it can give at-a-glance information of current mobile phone activity. If a response is required, the user can use touch input or other input functionality of the multifunction wristband 100 to execute rapid and simple actions when appropriate. This gives the user the ability to know and control some elements of their mobile phone's status and activity without having to physically handle the device.

Such functionality can be utilized in a variety of scenarios. For example, if there is an incoming call the multifunction wristband 100 can display the identification of the caller when available, enabling the user to have some indication of the importance of the call and whether they need to reach for their phone. In some embodiments, the user may be able to use the multifunction wristband 100 to route the call to voicemail by providing input (e.g., touching a button, making a gesture on a touchscreen, providing a certain movement, etc.). For example, a user may ignore an incoming call using a microaction such as a slight wrist flick or a shaking of the wrist. An accelerometer, gyroscope, or other sensor may be used to detect movement and/or orientation of the wristband. In a scenario in which the smart phone receives an incoming SMS message, the sender and message text of an incoming message can be displayed on the multifunction wristband 100. A simple response (e.g. "yes," "no," "ok," "thanks," etc.) can be selected from a set of predetermined responses and sent using the multifunction wristband 100.

The multifunction wristband 100 may also enable a user to setting and review settings of the mobile phone, enabling the user to check and set the mobile phone's current mode remotely. The predetermined responses may be programmed and/or customized by the user. This can be useful, for example, when access to the phone is restricted, such as when on a plane and the phone is in the overhead locker, or in a cinema once the film has started. In yet another scenario, the multifunction wristband 100 can be configured to display an unread message count, showing a numeric indication of how many unread messages exist in the user's inboxes (e.g. email, voicemail, social network, etc.). If there are few enough messages, or when a message is first received, additional information (e.g. sender, title) also can be displayed, to help the user decide whether they need access their mobile phone.

As shown in FIGS. 3A and 3B, the multifunction wristband 100 can include a user interface 300 (e.g., graphical user interface (GUI)) that can display a variety of information and enable a user to navigate through and manipulate the information. Such a user interface 300 can be utilized not only when the multifunction wristband 100 functions as a stand-alone device, but also when the multifunction wristband 100 functions generically as an extension an associated mobile phone.

For example, the user interface 300 of FIGS. 3A and 3B, when utilized with a touch screen or other touch surface, can provide "sliding scale" functionality. This enables a user to, after activating an area to edit or input, slide a finger along an appropriate area of the band which would "flick" though options or information displayed on the bands user interface. As an example, if a user wants to select a number, the user could swipe (i.e., drag a finger across the active area) until that number is reached. The faster the finger is swiped, the faster the numbers climb. If the user overshoots the number, the finger can be swiped in the other direction.

The user interface 300 can also be configured to provide "Glance At" information, enabling applications ("apps") executed on the associated mobile phone that could be specifically designed for use on and/or with a multifunction wristband 100. Any app that requires minimal input from the user could be suitable, especially those that display simple information, such as email, social media, SMS, and RSS feeds as described above. Similarly, the multifunction wristband 100 may be configured to be programmed with apps or may be provided with an API allowing the wristband to interact with a mobile phone or other device in any number of ways.

It can be noted that, although embodiments described above discuss providing extended functionality to mobile phones, such functionality can be provided with regard to other devices. Such other devices can include, for example, portable media players, tablet computers, and other personal electronic devices. In fact, embodiments may provide similar functionality to electronics that may not be portable, such as televisions, gaming consoles, and other electronics.

Figure 6:
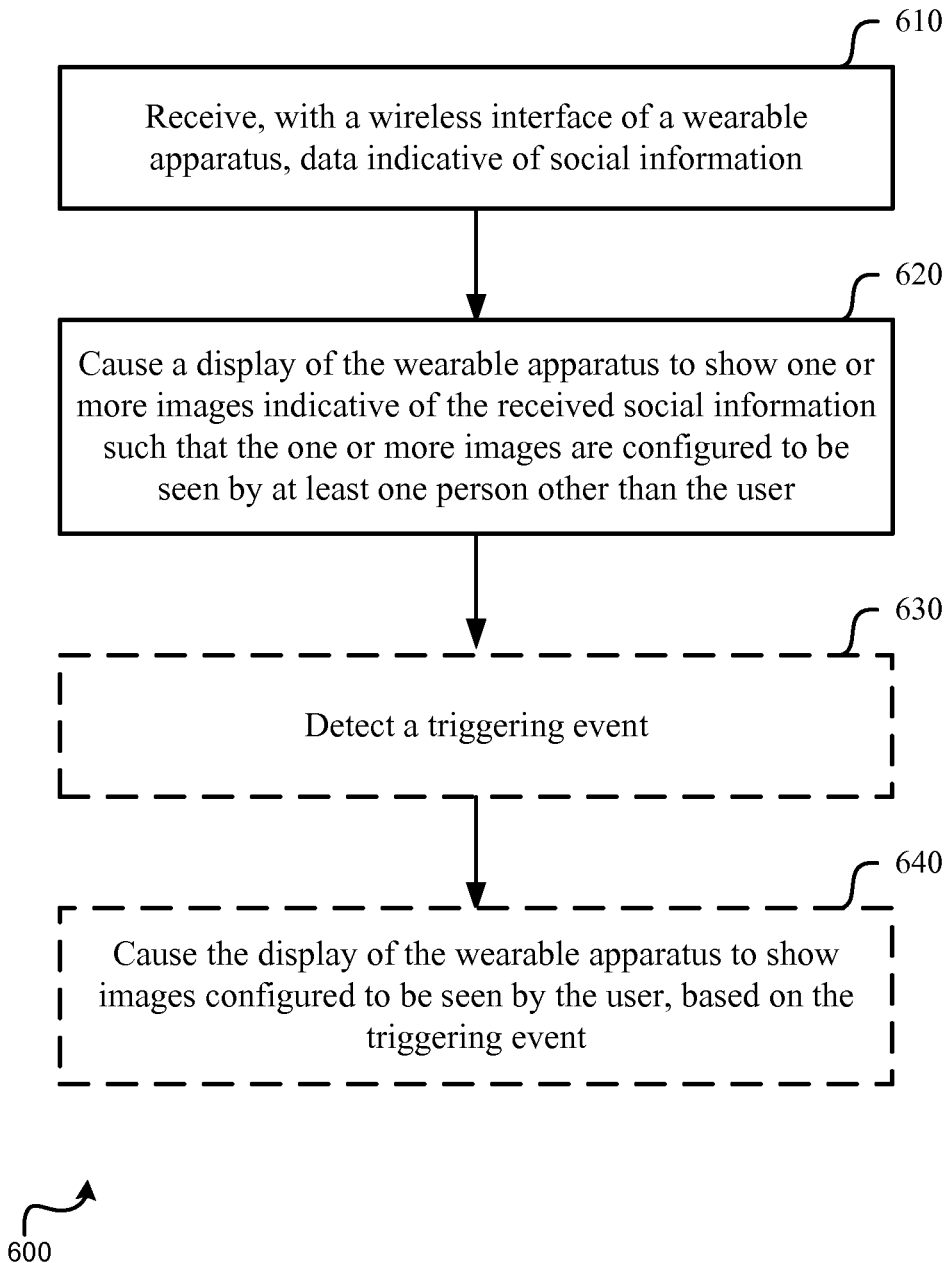
FIG. 6 is a flow diagram illustrating a method of displaying one or more images on a wearable apparatus, according to one embodiment.

FIG. 6 is a flow diagram illustrating one embodiment of a method 600 for displaying one or more images on a wearable apparatus, according to the techniques described herein. Means for performing some or all of the blocks illustrated in FIG. 6 can include hardware and/or software implemented by a multifunction wristband 100 as described above, including particular components of a multifunction wristband 100 as described below in relation to FIG. 7. Additionally or alternatively, at least some of the functionality of the method 600 may be implemented by a device communicatively coupled with a multifunction wristband 100.

At block 610, the method 600 includes receiving, with a wireless interface of the wearable apparatus, data indicative of social information. Depending on desired functionality, the social information can be received via a local electronic device, such as a mobile phone, or it may be obtained from a server or other remote device, via the Internet (or other data network) using a cellular, WiFi, and/or similar wireless interface providing a wireless data connection. Means for performing the functionality of block 610 can include the wireless interface(s) 730, antenna(s) 735, processing unit 710, and/or other hardware and/or software components shown in FIG. 7, described below.

As indicated previously, the social information can include any of a variety of items, such as an email, a song, a text message, an instant message, information related to a charitable organization, information received from a social network, information received from a website, and/or information received from an RSS feed.

At block 620, the method 600 includes causing a display of the wearable apparatus to show one or more images indicative of the received social information such that the one or more images are configured to be seen by at least one person other than the user. Accordingly, the social information can be conveyed to other people while the wearable apparatus is being worn by the user. Again, images (e.g., text, pictures, icons, video (or other animated image), color, etc.) may be sized, rotated, and/or located to facilitate viewing by other people. One or more sensors may be utilized to determine that the wearable apparatus is in a position to be viewed by others (e.g., a wearable apparatus, such as a wristband, enters a public mode based on detected orientation, movement, gaze and/or eye detection, and the like). For example, a gyroscope in the wristband may be used to determine an orientation of the wristband and/or an accelerometer may be used to determine that the user is walking. In such examples, the a position and/or orientation of content on the display may be configured according to one or more functions or reference tables, for example, associating the gyroscopic data and/or accelerometer data with the position and/or orientation. (Further, one or more cameras or ambient light sensors at the wristband may be used to determine when to activate or cease functions of the display.) Other embodiments are possible, several of which are described herein. Means for performing the functionality of block 620 can include the display 740, processing unit 710, memory 720, sensor(s) and/or other hardware and/or software components shown in FIG. 7, described below. In some embodiments, data from such means may be used to determine a context of the user and configure information for display appropriately. For example, audio data and/or calendar data may be used to determine that a wearer of the wristband is at home with their family, or in a public or social setting such as at a party, and images may be shown so as to be seen by at least one person other than the wearer. Moreover, the functionality of block 620 may be performed, at least in part, by a device communicatively coupled with the wearable apparatus. For example a connected device may receive information from the wearable apparatus and do the configuring of the one or more images.

Optionally, at block 630, a triggering event can be detected, in which case, at block 640, the method includes causing the display of the wearable device to show images configured to be seen by the user, based on the triggering event. As described above, any of a variety of actions can cause the wearable apparatus to switch from a public mode to a personal mode. Such triggering events can include, for example, certain detected movements and/or orientations, user input, received information (e.g., incoming call, SMS message, etc.), scheduled events (e.g., calendar reminders), the detected proximity of another wearable apparatus, and the like. The wearable apparatus may include a touch screen, motion sensor, and/or orientation sensor, which may facilitate the detection of the triggering event. Furthermore, in addition to altering the images on the display, the wearable apparatus can notify the user of a triggering event using, for example, a vibrational, audio, and/or other indicator. Means for performing the functionality of block 630 can include the sensor(s) 760, touch surface 750, wireless interface(s) 730, wireless transaction unit 790, processing unit 710, memory 720, and/or other hardware and/or software components shown in FIG. 7, described below. Means for performing the functionality of block 640 can include the display 740, processing unit 710, memory 720, and/or other hardware and/or software components shown in FIG. 7. Again, the functionality of blocks 630 and/or 640 may be performed, at least in part, by a device communicatively coupled with the wearable apparatus. For example, a mobile phone could notify a wearable apparatus of an incoming telephone call, in which case the mobile phone and/or wearable apparatus may enter a personal mode by showing a caller identity on a display, configured to be seen by the user. In another example, the wearable apparatus may send motion information to a mobile phone, which determines from the motion information that the user is lifting the wearable apparatus towards his or her face. The mobile phone could then send data to the wearable apparatus to cause the wearable apparatus to display items to be viewed by the user. In some embodiments, the triggering event may comprise a change in context of the user, for example from a home or social context to a work context. In such embodiments, the mobile phone may collect data from various sensors and infer respective contexts of the user in some embodiments.

It should be appreciated that the specific steps illustrated in FIG. 6 provide an example method 600 of displaying one or more images on a wearable apparatus according to the techniques described herein. Alternative embodiments may include alterations to the embodiments shown. Additional features may be added, removed, performed simultaneously, combined, and/or otherwise altered depending on the particular applications. One of ordinary skill in the art would recognize many variations, modifications, and alternatives.

Figure 7:
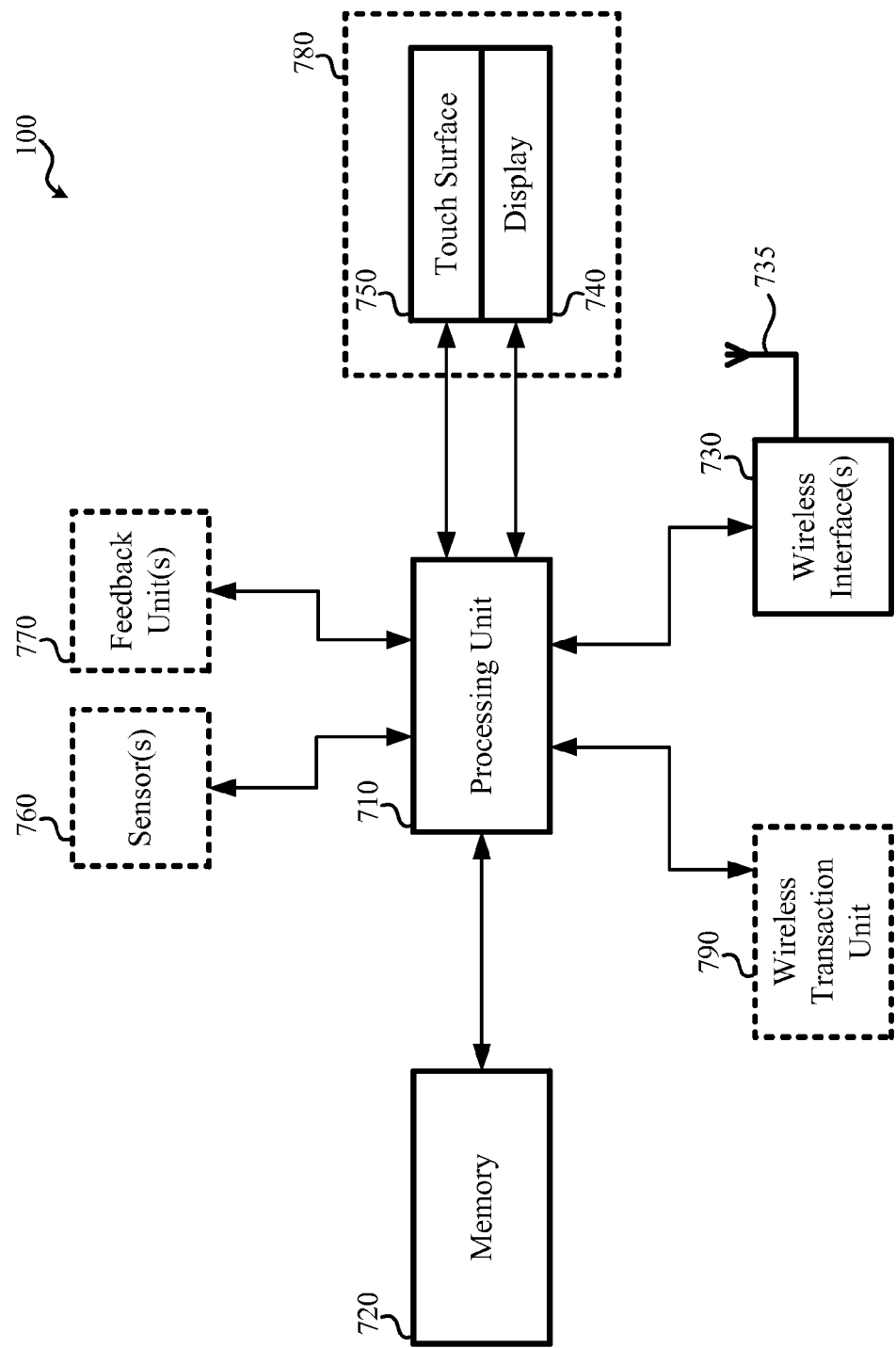
FIG. 7 is a simplified block diagram of a multifunction wristband, according to certain embodiments.

FIG. 7 is a simplified block diagram of a multifunction wristband 100, according to certain embodiments, which can provide for some or all of the functionality described above, including the method described in FIG. 6. Additionally or alternatively, some or all of the components shown in FIG. 7 may be implemented in a device communicatively connected with a multifunction wristband 100. The components shown can be implemented by any combination of hardware and/or software, and may be combined and/or separated depending on desired functionality. A person of ordinary skill in the art will recognize various additions, omissions, substitutions, and other variations.

The multifunction wristband 100 can include a touch screen 780 comprising a touch surface 750 and display 740. The touch surface 750 can utilize any of a variety of touch technologies, such as resistive, acoustic, capacitive, infrared, optical imaging, and the like, to be able to receive input through contact with the touch surface. Additionally or alternatively, the multifunction wristband 100 can include one or more buttons or other input devices to provide similar functionality. Similarly, the display 740 can employ any of a variety of technologies, such as liquid crystal display (LED), light-emitting diode (LED), organic LED (OLED), active-matrix OLED (AMOLED), super AMOLED, microelectromechanical systems (MEMS) displays (such as Mirasol® or other interferometric display), and the like. In some embodiments (e.g., LCD) the touch surface 750 is overlaid on top of the display 740. In other embodiments however (e.g., AMOLED), the display 740 and touch surface 750 technologies are integrated. Depending on desired functionality, manufacturing concerns, cost, and other factors, the display 740 may be a flexible display, as illustrated in FIGS. 1 and 4, which can stretch up to 360-degrees along the outer surface of the multifunction wristband 100 and/or can show a range of colors simultaneously around its circumference. Flexible displays may incorporate flexible substrates, flexible fibers (e.g., optical fibers, conductive threads, etc.), and/or "smart" fabrics capable of emitting light and/or forming electric or electro-optic circuitry. Alternatively, the display 740 may comprise one or more rigid displays. Furthermore, in some embodiments (including embodiments where a rigid display is used), the multifunction wristband 100 may include a plurality of linked and/or segmented displays to be able to provide information at a variety of viewing angles around a user's wrist.

The multifunction wristband 100 can also include wireless interface(s) 730 that can be utilized to communicate with a smart phone, a wireless network, a location positioning network, another multifunction wristband 100, and other wireless communication devices, systems, and/or networks. Depending on the desired functionality, the wireless interface(s) 730 can include a circuitry and/or software to employ one or more of a variety of wireless technology standards. Such wireless technology standards can include, for example, Bluetooth®, IEEE 802.11, WiFi, WiMax, Peanut®, NFC, cellular communication (GSM, CDMA, etc.), Global Navigation Satellite System (GNSS) (e.g., Global Positioning System (GPS)) and/or other positioning systems, and the like.

Figure 8:
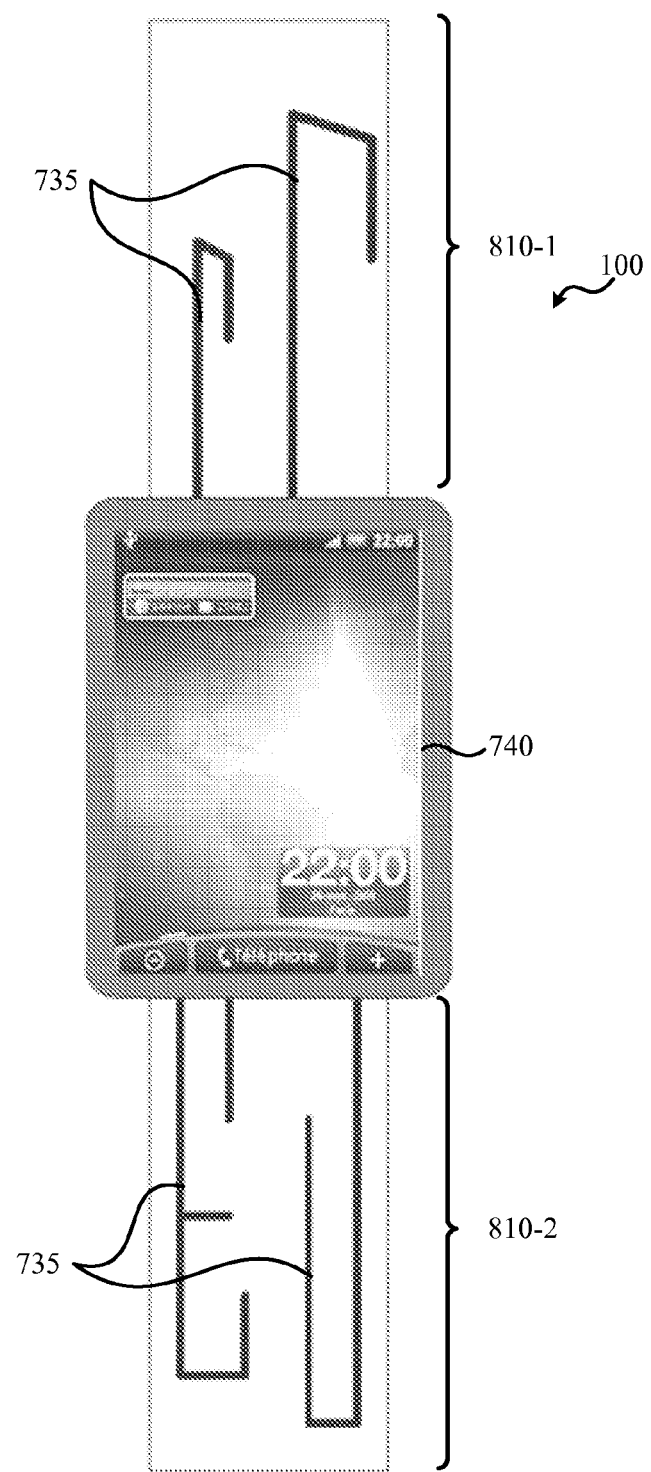
FIG. 8 is a simplified illustration of a multifunction wristband having a plurality of antennas disposed on either side of a display, according to one embodiment.

The wireless interface(s) 730 can include one or more antennas 735 utilized to transmit and/or receive radio frequency (RF) signals. Where the multifunction wristband 100 includes multiple antennas, some antennas can be situated such that antennas for different wireless technology standards are relatively isolated from one another. FIG. 8 is a simplified illustration of a multifunction wristband 100 having a plurality of antennas 735 disposed on either side of a display 740, according to one embodiment. In this embodiment, a first set of antennas 810-1 is located on a first side of the display 740. The first set of antennas 810-1 can include receive antennas such as GNSS, wireless wide-area network (WWAN), and other receive antennas (including diversity antennas). A second set of set of antennas 810-2 disposed on an opposite side of the display 740 can include transmitter antennas, such as those utilized by the wireless technology standards described above in relation to the wireless interface(s) 730. Such physical separation can help prevent unwanted interference between different wireless interface(s) 730 of the multifunction wristband 100. The antennas 735 themselves can be, for example, wire-inverted F antennas (WIFA). Other flexible antenna technologies that can be embedded in a multifunction wristband 100 are also contemplated. Similar isolation techniques are contemplated for different embodiments. Furthermore, the display 740 and/or either or both sets of antennas 810 may be implemented in one or more devices connected to the multifunction wristband 100, such as a mobile phone and/or other electronic device.

Referring again to FIG. 7, the multifunction wristband 100 can optionally include a wireless transaction unit 790. As described earlier, a wireless transaction unit can include one or more active and/or passive technologies, such as NFC, RFID, etc., to conduct identification, payment, and/or other transactions. Depending on desired functionality, the wireless transaction unit 790 may communicate information to other components (e.g., a processing unit 710) and/or a wirelessly-connected mobile phone. Moreover, wireless transaction unit 790 may be integrated into and/or communicate with the wireless interface(s) 730.

The multifunction wristband 100 also can optionally include sensor(s) 760 and/or feedback unit(s) 770. These components can help relay information to and/or from a wearer of the multifunction wristband 100. For example, feedback unit(s) 770 can include a speaker and/or a vibrational component that can provide audio and/or vibrational indicators to a wearer. The sensor(s) 760 can collect information from a user, such as user input (in addition or alternative to the touch surface 750). Such sensors can include devices for capturing light (e.g., photocell, photoreceptor, camera, etc.), audio (e.g., microphone), and/or motion/orientation (e.g., accelerometer, gyroscope, etc.). Detection of motion and/or orientation can allow a wearer to make a motion or gesture with the wrist to which the multifunction wristband 100 is fastened to provide input to the multifunction wristband 100 and/or associated mobile phone as detailed previously. Additionally or alternatively, detection of orientation can allow the multifunction wristband 100 to change what is shown on the display. For example, where the display 740 is a flexible display viewable from multiple angles around the wearer's wrist, the multifunction wristband 100 can determine which portion of the display 740 is facing upward and cause images and/or other notifications to be shown on that portion of the display.

Connected with various components of the multifunction wristband 100 is a processing unit 710. The processing unit 710 can include, without limitation, one or more general-purpose processors and/or one or more special-purpose processors (e.g., digital signal processors (DSPs), application specific integrated circuits (ASICs), field programmable logic arrays (FPGAs), or other equivalent integrated or discrete logic circuitry), which can be coupled with a memory 720. The memory 720 can comprise, without limitation, local and/or wirelessly-accessible computer- or machine-readable media. Such media can include, without limitation, magnetic, optical, and/or solid-state storage such as a random access memory ("RAM"), a read-only memory ("ROM"), and/or other non-transitory or tangible media which can be programmable, flash-updateable and/or the like. Such storage devices may be configured to implement any appropriate data storage, including without limitation, various file systems, database structures, and/or the like.

The processing unit 710 and/or memory 720 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. These software elements can include instructions, stored on a non-transitory computer-readable storage medium of the processing unit 710, memory 720, and/or other component of the multifunction wristband 100. In some embodiments, some or all of these instructions may be stored on a device (e.g., mobile phone) to which the multifunction wristband 100 is communicatively connected. These instructions might take the form of executable code, which is executable by the processing unit 710 and/or might take the form of source and/or installable code, which, upon compilation and/or installation on the multifunction wristband 100 (e.g., using any of a variety of generally available compilers, installation programs, compression/decompression utilities, etc.), then takes the form of executable code. When installed on the multifunction wristband 100, the processing unit 710 is then configured to perform the functions provided by the instructions.

Substantial variations may be made in accordance with specific requirements. For example, customized hardware might also be used, and/or particular elements might be implemented in hardware, software (including portable software, such as applets, etc.), or both.

The multifunction wristband 100 can also include a mechanism for attaching to the user, which can vary depending on desired functionality. For example, a body may be configured to fully wrap around and/or be fastened to a user's wrist, as shown in FIGS. 1 and 4. Alternatively, the multifunction wristband 100 can include a band similar to a wristwatch, as illustrated in FIG. 8. Other means for attaching the multifunction wristband 100 to the user can include, without limitation, one or more bands, ribbons, bracelets, wires, chains, and/or other such mechanisms.

Furthermore, it can be noted that, although examples and embodiments described herein are described in relation to a wristband, the disclosure is not so limited. Devices providing the functionality disclosed herein can have different form factors worn at different parts of a wearer's body. Yet other embodiments contemplate form factors that are not worn, but may be carried or otherwise accompany a user and/or mobile phone. In some embodiments, a device may be attached to or integrated with a user's clothing, for example in "smart clothing," "smart fabric," and/or e-textiles. For example, a display integrated with a snowboard jacket may be used to display information regarding music that a user is listening to or a brand that sponsors the user.

It also can be noted that, although certain examples and embodiments described herein disclose a wristband device associated with a mobile phone, the disclosure is not so limited. For example, in embodiments where the wristband device is used as a slave device, the wristband device (or other device) may be associated with any of a variety of personal electronic devices, such as tablets, laptops, personal computers, and the like. Moreover, the wristband may be associated with multiple devices. A person of ordinary skill in the art will recognize many additions, substitutions, and modifications. It will be appreciated that not only may the wristband be used to extend functionality of an associated device, but the wristband may be used to socially display information or interact with other users or devices.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A wearable apparatus comprising:
a wristband configured to be worn by a wearer, the wristband having an exterior surface;
at least one sensor disposed in the wristband;
a wireless interface configured to receive social information from an external device, wherein the wireless interface is mechanically coupled to the wristband;
one or more displays disposed on the exterior surface of the wristband; and
a processing unit mechanically coupled to the wristband, wherein the processing unit is communicatively coupled to the wireless interface, the at least one sensor, and the one or more displays, and the processing unit is configured to:
in response to detection of a first triggering event:
cause the one or more displays to operate in a personal mode,
determine a first orientation of the wearable apparatus with respect to a bodily movement or orientation of the wearer based on a first sensor signal received from the at least one sensor,
determine a first portion of the one or more displays oriented towards the wearer based on the first determined orientation, and
cause the first portion of the one or more displays to display one or more images associated with social information received via the wireless interface, and
in response to detection of a second triggering event:
cause the one or more displays to operate in a public mode,
determine a second orientation of the wearable apparatus with respect to a bodily movement or orientation of the wearer based on a second sensor signal received from the at least one sensor,
determine a second portion of the one or more displays oriented away from the wearer based on the second determined orientation, and
cause the second portion of the one or more displays to display the one or more images associated with the received social information.

2. The wearable apparatus of claim 1, wherein the first triggering event is an indication for the wearer to authorize payment to an entity; and
the second triggering event is an indication that payment has been accepted by the entity.

3. The wearable apparatus of claim 2, wherein the processing unit is configured to cause the one or more displays to enlarge a size of at least a portion of the one or more images when operating in the public mode.

4. The wearable apparatus of claim 2, wherein the one or more images are associated with the entity.

5. The wearable apparatus of claim 1, wherein the processing unit is further configured to:
detect, with the wireless interface, a proximity of another wearable apparatus; and
transmit to the another wearable apparatus, with the wireless interface or another wireless interface, information indicative of the one or more images.

6. The wearable apparatus of claim 1, further comprising one or more feedback units capable of providing at least one of:
a vibrational indicator, or
an audio indicator.

7. The wearable apparatus of claim 2, further comprising one or more sensors capable of receiving input from the wearer indicating authorization of the payment to the entity.

8. The wearable apparatus of claim 7, wherein the wireless interface is further configured to transmit input to the device based, at least in part, on the input from the wearer.

9. The wearable apparatus of claim 7, wherein the one or more sensors include at least one of:
a biometric sensor; or
a camera.

10. The wearable apparatus of claim 7, wherein the input from the wearer includes a payment amount of the payment to the entity.

11. The wearable apparatus of claim 1, wherein the one or more images displayed in the public mode includes only a portion of the one or more images displayed in the personal mode, the portion being less than all of the one or more images displayed in the personal mode.

12. The wearable apparatus of claim 1, wherein the device comprises a mobile phone or a server.

13. The wearable apparatus of claim 1, wherein the one or more displays comprise a flexible display.

14. The wearable apparatus of claim 1, wherein the apparatus is configured such that, when the wearable apparatus is worn on a wrist of the wearer, the first portion of the one or more displays is disposed on a first side of the wrist of the wearer and the second portion of the one or more displays is disposed on a second side of the wrist of the wearer, the second side being different from the first side.

15. The wearable apparatus of claim 1, wherein the first portion is disposed on a first display of the one or more displays and the second portion is disposed on a second display of the one or more displays, the first display being different from the second display.

16. The wearable apparatus of claim 1, wherein the one or more displays are one singular display.

17. The wearable apparatus of claim 1, wherein the one or more displays are disposed along a substantially contiguous contour defined by the exterior surface.

18. A wearable apparatus for displaying images, the wearable apparatus comprising:
wristband means for attaching the wearable apparatus to a wearer, the wristband having an exterior surface;
sensing means for sensing an orientation of the wearable apparatus;
communication means for wirelessly receiving social information from an external device, wherein the communication means is mechanically coupled to the wristband means; and
display means disposed on the exterior surface of the wristband means, the display means comprising one or more displays; and
processing means mechanically coupled to the wristband means, wherein the processing means is communicatively coupled to the communication means, the sensing means, and the display means, and the processing means is configured to:
in response to detection of a first triggering event:
cause the one or more displays to operate in a personal mode,
determine a first orientation of the wearable apparatus with respect to a bodily movement or orientation of the wearer based on a first sensor signal received from the sensing means,
determine a first portion of the display means oriented towards the wearer based on the first determined orientation, and
cause the first portion of the display means to display one or more images associated with social information received via the communication means, and
in response to detection of a second triggering event:
cause the display means to operate in a public mode,
determine a second orientation of the wearable apparatus with respect to a bodily movement or orientation of the wearer based on a second sensor signal received from the sensing means,
determine a second portion of the display means oriented away from the wearer based on the second determined orientation, and
cause the second portion of the display means to display the one or more images associated with the received social information.

19. The wearable apparatus of claim 18, wherein first triggering event is an indication for the wearer to authorize payment to an entity; and
the second triggering event is an indication that payment has been accepted by the entity.

20. The wearable apparatus of claim 19, wherein the processing means are configured to cause the display means to enlarge a size of at least a portion of the one or more images when operating in the public mode.

21. The wearable apparatus of claim 19, wherein the one or more images are associated with the entity.

22. The wearable apparatus of claim 18, wherein the processing means is further configured to:
detect, with the communication means, a proximity of another wearable apparatus; and
transmit to the another wearable apparatus, with the communication means or another communication means, information indicative of the one or more images shown with the display means.

23. The wearable apparatus of claim 18, further comprising feedback means capable of providing at least one of:
a vibrational indicator, or
an audio indicator.

24. The wearable apparatus of claim 19, further comprising second sensing means capable of receiving input from the wearer indicating authorization of the payment to the entity.

25. The wearable apparatus of claim 24, wherein the communication means are further configured to transmit input to the device based, at least in part, on the input from the wearer.

26. The wearable apparatus of claim 24, wherein the second sensing means includes at least one of:
a biometric sensor; or
a camera.

27. The wearable apparatus of claim 24, wherein the input from the wearer includes a payment amount of the payment to the entity.

28. The wearable apparatus of claim 18, wherein the one or more images displayed in the public mode includes a portion of the one or more images displayed in the personal mode, the portion being less than all of the one or more images displayed in the personal mode.

29. One or more non-transitory computer-readable media storing computer-executable instructions that, when executed by one or more processors, cause the one or more processors to:
receive, via a wireless interface of a wearable apparatus, social information from an external device, wherein the wearable apparatus includes a wristband configured to be worn by a wearer, the wristband having an exterior surface and wherein the wireless interface and the one or more processors are mechanically coupled to the wristband; and
in response to detection of a first triggering event:
cause one or more displays to operate in a personal mode,
receive a first sensor signal from a sensor coupled to the wearable apparatus,
determine a first orientation of the wearable apparatus with respect to a bodily movement or orientation of the wearer based on the first sensor signal,
determine a first portion of the one or more displays oriented towards the wearer based on the first determined orientation, and
cause the first portion of the one or more displays to display one or more images associated with social information received via the wireless interface, and in response to detection of a second triggering event:
   cause the one or more displays to operate in a public mode,
   receive a second sensor signal from the sensor,
   determine a second orientation of the wearable apparatus with respect to a bodily movement or orientation of the wearer based on the second sensor signal,
   determine a second portion of the one or more displays oriented away from the wearer based on the second determined orientation, and
   cause the second portion of the one or more displays to display the one or more images associated with the received social information.

30. A method of displaying images on a wearable apparatus, the method comprising:
   receiving, by one or more processors via a wireless interface of the wearable apparatus, social information from an external device, wherein the apparatus includes a wristband configured to be worn by a wearer, the wristband having an exterior surface and wherein the wireless interface and the one or more processors are mechanically coupled to the wristband; and
   in response to detecting of a first triggering event:
      causing one or more displays to operate in a personal mode, the one or more displays coupled to the wearable apparatus,
      receiving a first sensor signal from a sensor coupled to the wearable apparatus,
      determining a first orientation of the wearable apparatus with respect to a bodily movement or orientation of the wearer based on the first sensor signal,
      determining a first portion of the one or more displays oriented towards the wearer based on the first determined orientation, and
      causing the first portion of the one or more displays to display one or more images associated with social information received via the wireless interface, and
   in response to detecting a second triggering event:
      causing the one or more displays to operate in a public mode,
      receiving a second sensor signal from the sensor,
      determining a second orientation of the wearable apparatus with respect to a bodily movement or orientation of the wearer based on the second sensor signal;
      determining a second portion of the one or more displays oriented away from the wearer based on the second determined orientation, and
      causing the second portion of the one or more displays to display the one or more images associated with the received social information.

31. The method of claim 30, wherein the first triggering event is an indication for the wearer to authorize payment to an entity; and
   the second triggering event is an indication that payment has been accepted by the entity.

32. The method of claim 31, further comprising causing the one or more displays to enlarge a size of at least a portion of the one or more images when operating in the public mode.

33. The method of claim 31, further comprising providing feedback to the wearer indicating the detection of the second triggering event.

34. The method of claim 31, wherein the one or more images are associated with the entity.

35. The method of claim 30, further comprising:
   detecting, with the wireless interface, a proximity of another wearable apparatus; and
   transmitting to the another wearable apparatus, with the wireless interface or another wireless interface, information indicative of the one or more images.

36. The method of claim 31, further comprising receiving, using one or more sensors, input from the wearer indicating authorization of the payment to the entity.

37. The method of claim 36, further comprising transmitting input to the device based, at least in part, on the input from the wearer.

38. The method of claim 36, wherein the one or more sensors include at least one of:
   a biometric sensor; or
   a camera.

39. The method of claim 36, wherein the input from the wearer includes a payment amount of the payment to the entity.

40. The method of claim 30, wherein the one or more images displayed in the public mode includes a portion of the one or more images displayed in the personal mode, the portion being less than all of the one or more images displayed in the personal mode.

* * * * *